US011301777B1

(12) United States Patent
Talmor

(10) Patent No.: US 11,301,777 B1
(45) Date of Patent: Apr. 12, 2022

(54) DETERMINING STAGES OF INTENT USING TEXT PROCESSING

(71) Applicant: Meta Platforms, Inc., Menlo Park, CA (US)

(72) Inventor: Yoram Talmor, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 639 days.

(21) Appl. No.: 15/957,507

(22) Filed: Apr. 19, 2018

(51) Int. Cl.
*G06N 20/00* (2019.01)
*G06F 40/205* (2020.01)
*G06F 40/289* (2020.01)
*H04L 51/04* (2022.01)

(52) U.S. Cl.
CPC ........... *G06N 20/00* (2019.01); *G06F 40/205* (2020.01); *G06F 40/289* (2020.01); *H04L 51/04* (2013.01)

(58) Field of Classification Search
CPC ........ G06F 40/205; H04L 51/04; G06N 20/00
See application file for complete search history.

(56) References Cited

U.S. PATENT DOCUMENTS

| | | | |
|---|---|---|---|
| 9,767,489 B1* | 9/2017 | Liu .................... | G06Q 30/0241 |
| 10,026,037 B2* | 7/2018 | Brigham ............. | G06Q 10/107 |
| 10,108,707 B1* | 10/2018 | Chu ...................... | G10L 15/26 |
| 10,210,244 B1* | 2/2019 | Branavan ............... | G06F 40/30 |
| 2009/0327263 A1* | 12/2009 | Maghoul ............. | G06F 16/3329 |
| 2010/0086108 A1* | 4/2010 | Jaiswal ................... | G10L 17/00 |
| | | | 379/88.04 |
| 2011/0184736 A1* | 7/2011 | Slotznick ............. | G10L 15/1815 |
| | | | 704/249 |
| 2012/0059713 A1* | 3/2012 | Galas ................. | G06Q 30/0247 |
| | | | 705/14.49 |
| 2012/0253930 A1* | 10/2012 | Gao .................... | G06Q 30/0251 |
| | | | 705/14.53 |
| 2012/0254318 A1* | 10/2012 | Poniatowski ...... | H04N 21/4788 |
| | | | 709/206 |
| 2013/0290091 A1* | 10/2013 | Benyamin .......... | G06Q 30/0255 |
| | | | 705/14.41 |
| 2014/0108455 A1* | 4/2014 | Castellanos ......... | G06F 16/2465 |
| | | | 707/776 |
| 2016/0217501 A1* | 7/2016 | Brigham ................ | G06N 20/00 |
| 2016/0224524 A1* | 8/2016 | Kay ...................... | G06F 3/0236 |

(Continued)

*Primary Examiner* — Ryan F Pitaro
(74) *Attorney, Agent, or Firm* — Fenwick & West LLP

(57) ABSTRACT

A messaging server provides conversational text subsets to a machine-learned model that analyzes the text subsets to identify intents expressed therein. The messaging server determines intent groups associated with the text subsets based on the expressed intents. An intent group describes a category representing a subject area in which a text subset may express intent, and also describes a stage of the category representing a strength of the expressed intent. The messaging server applies decay factors to the intent groups. The decay factors include decay rates that describe how long the types of intents represented by the intent groups are maintained. The messaging server has access to suggestions having associated targeting criteria including intent groups to which the suggestions are targeted. The message server uses the targeting criteria to select suggestions targeted to users associated with particular text subsets, and delivers the selected suggestions to the users.

17 Claims, 6 Drawing Sheets

(56) References Cited

U.S. PATENT DOCUMENTS

| | | |
|---|---|---|
| 2017/0220559 A1* | 8/2017 | Fujiwara ................. G06F 40/58 |
| 2017/0366621 A1* | 12/2017 | Sagar ..................... G06F 40/205 |
| 2018/0004730 A1* | 1/2018 | Qiu ........................ G06F 40/58 |
| 2018/0191643 A1* | 7/2018 | Berry .................... H04L 51/046 |
| 2018/0307687 A1* | 10/2018 | Natkin .................. G06F 16/248 |
| 2019/0156822 A1* | 5/2019 | Manuvinakurike ..... G10L 25/78 |
| 2019/0199656 A1* | 6/2019 | Foerster ................. H04L 51/02 |
| 2019/0221133 A1* | 7/2019 | Terry ................. G09B 19/0053 |
| 2019/0370412 A1* | 12/2019 | Hammontree .... G06F 16/90332 |
| 2020/0058299 A1* | 2/2020 | Lee ......................... G06F 40/30 |
| 2020/0151255 A1* | 5/2020 | Zong ...................... G06F 40/30 |
| 2020/0184515 A1* | 6/2020 | deWet ................ G06Q 30/0254 |
| 2020/0220741 A1* | 7/2020 | Sai ..................... H04L 12/1831 |

\* cited by examiner

DETERMINING STAGES OF INTENT USING TEXT PROCESSING

BACKGROUND

This disclosure relates generally to processing text, and more particularly to determining stages of intents expressed within the processed text.

Users may interact with each other in a messaging system, sending messages back and forth to each other in a text-based conversation between two or more users. A user may have an associated user account in the messaging system, the user account providing an online identity, a destination for messages directed to the user, and generally coordinating the user's access to and use of the messaging system. A user may access the messaging system from a variety of endpoints, including mobile devices (e.g., cellphones), desktop computers, web browsers, specialized messaging applications, etc.

The messaging system may enhance the users' experiences by providing the users with relevant content items. However, using computer-implemented techniques to identify such content items is difficult.

SUMMARY

A messaging server establishes a set of categories for which intents are to be captured. The categories represent different subject areas in which intents may be expressed, such as vehicles, travel, and food. The messaging server also establishes a set of stages for each category. A stage describe the strength of an intent, for example, interest, decision, and action. A given intent for a category may have multiple ordered stages, where each successive stage represents increasingly stronger intent. Together, the category and stage pair are referred to as an intent group.

The messaging server associates sets of stages with particular intent groups. The messaging server expands the vocabulary of stages for the intent groups. The messaging server uses the expanded vocabularies to build machine-learned intent models. The intent models, when applied to conversational text input, associates the input text with a given intent group if the text indicates the type of intent represented by the intent group.

The messaging server analyzes a subset of conversational text input associated with a user of the messaging system. The messaging server identifies features from the analyzed text. The messaging server associates the text input with one or more intent groups based on the features and the intent models. In one application, the messaging server delivers content items, such as targeted suggestions, to users. The content items are selected based at least in part on targeting criteria associated with the items.

The figures depict various embodiments of the present invention for the purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
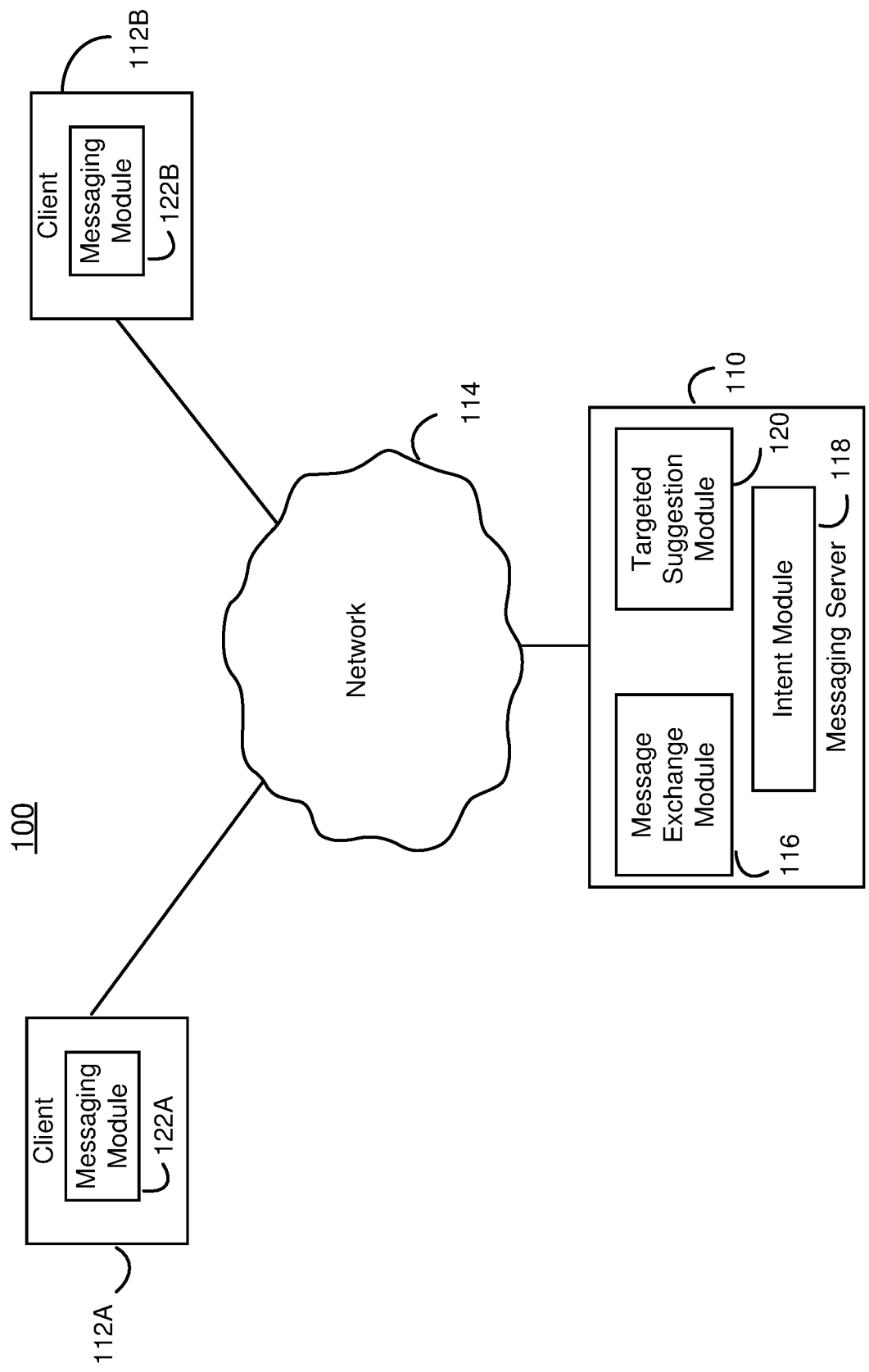
FIG. 1 is a high-level block diagram illustrating a system environment including an electronic messaging server.

FIG. 1 is a high-level block diagram illustrating a system environment 100 including an electronic messaging server 110. The environment 100 also includes two clients 112A, 112B connected to the messaging server 110 via a network 114. While FIG. 1 shows only two clients 112 and a single messaging server 110, embodiments of the environment 100 may have many clients and multiple messaging servers connected to the network 114. Other components may also be connected to the network 114.

FIG. 1 uses like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral. For example, "112" in the text refers to reference numerals "112A," and/or "112B" in the figures.

A client 112 is a computing device that can transmit and/or receive data via the network 114. A user may use the client 112 device to perform functions such as exchanging messages using the messaging server 110, browsing websites on web servers on the network 114, consuming digital content received via the network, and executing software applications. For example, the client 112 may be a smartphone or a tablet, notebook, or desktop computer. In addition, the client 112 may be an Internet-of-Things (IoT)-connected device such as a home appliance. The client 112 may include a display device on which the user may view digital content, such as messages exchanged using the messaging server 110.

The client 112 may execute one or more applications ("apps") that extend the functionality of the client. The apps may include a web browser that allows the client device 112 to interact with websites provided by web servers connected to the network 114. The apps may also include one or more dedicated apps for accessing the messaging server 110. In one embodiment, the user downloads and installs apps on the client 112 for specific purposes, such as exchanging messages using the messaging server 110. Alternatively, the functionality of an app may be incorporated into an operating system of the client 112 or included in native functionality of the client.

The messaging module 122 illustrated within the client 112 in FIG. 1 represents an app for interacting with the messaging server 110 via the network 114. The messaging module 122 enables a user of the client 112 to exchange messages with users of other clients. In one embodiment, the messaging module 122 exchanges such messages with the messaging server 110. In another embodiment, some or all of the messages are exchanged peer-to-peer among the clients 112 and do not necessarily pass through the messaging server 110. The messaging module 122 displays or otherwise presents messages exchanged using the messaging server 110 to the user of the client 112. The messaging module 122 may also present other types of content items to the user, such as targeted suggestions received from the messaging server 110 or another entity.

The messaging server 110 interacts with the messaging modules 122 of the clients 112 to support the exchange of electronic messages among users. In one embodiment, the messaging server 110 includes a message exchange module 116, an intent module 118, and a targeted suggestion module 120. Other embodiments of the messaging server 110 may include additional and/or different modules. In addition, operations may be distributed among the modules in a different manner than described herein. The messaging server 110 may be implemented using one or more dedicated computers and/or a cloud computing platform. The messaging server 110 may be dedicated to supporting messaging with clients 112, may provide additional services, or may be integrated into a platform that also provides other services.

The message exchange module 116 facilitates the exchange of electronic messages among users of the messaging server 110. In one embodiment, the message exchange module 116 receives messages from the messaging modules 122 of the clients 112 and relays the messages to the recipients. A given message includes message content, an identifier (ID) of the sender that sent the message (e.g., the user of the client 112) and an ID of the recipient of the message. The message may also include a thread ID identifying the message thread (also referred to as the "context") to which the message belongs. The message exchange module 116 uses the information included in the message to relay the message to one or more recipients. A given message can be relayed from a user to a single recipient as a one-to-one message exchange, or from one user to multiple recipients in a one-to-many message exchange.

The intent module 118 applies natural language processing to input text to determine intents within the input text. "Intent" here refers to an expressed interest in performing a future action. The intent module 118 determines the intents with respect to a set of categories. The input text may express different intents with respect to different categories. In addition, the intent module 118 determines stages for the expressed intents. A stage generally represents the strength of an intent to perform the future action. A given intent for a category may have multiple ordered stages, where each successive stage represents increasingly stronger intent to perform the action. Together, the category and stage pair are referred to as an intent group.

The targeted message module 120 provides targeted suggestions to the users of the clients 112 based in part on the intent groups expressed by input text associated with the users. In one embodiment, the targeted suggestion module 120 provides the targeted suggestions via the message exchange module 116 so that the suggestions appear to users as regular messages exchanged using the messaging server 110. In another embodiment, the targeted suggestions module 120 provides the targeted suggestions separately from the messages exchanged using the messaging server 110.

The messaging server 110 is thus able to precisely segment the users of the clients 112 based on the intent groups (i.e., categories and stages) expressed in the input text associated with the respective users. As a result, the messaging server 110 can provide individual users with targeted suggestions. The quality of the users' interactions with the messaging server 110 is therefore increased.

The network 114 exchanges information among clients, servers, and systems connected to it. In one embodiment, the network 114 uses standard communications technologies and/or protocols. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 114 may be represented using any suitable format, such as hypertext markup language (HTML) or extensible markup language (XML). In some embodiments, all or some of the communication links of the network 114 may be encrypted using any suitable technique or techniques.

Figure 2:
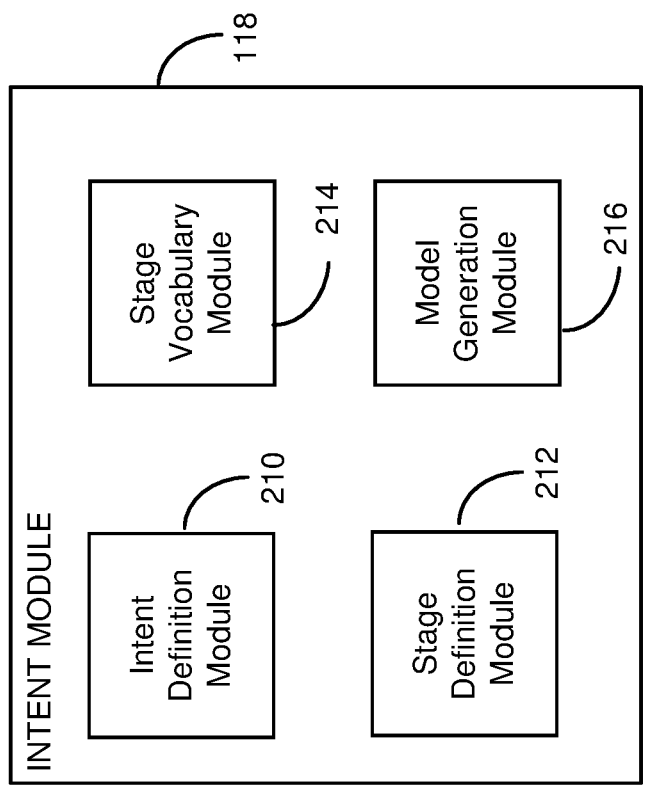
FIG. 2 is a block diagram illustrating a more detailed view of the intent module according to one embodiment.

FIG. 2 is a block diagram illustrating a more detailed view of the intent module 118 according to one embodiment. The intent module 118 shown in FIG. 2 includes multiple modules within it. In some embodiments, the intent module 118 may include additional, fewer, or different modules than those described herein. In addition, the operations attributed to specific modules herein may be performed by other modules in other embodiments.

An intent definition module 210 describes phrases representing intents within categories. In an embodiment, the intent definition module 210 establishes a set of categories for which intents are to be captured. The categories represent different subject areas (e.g., vertical markets) in which intents may be expressed. For example, the set of categories may include vehicles, travel, and food.

In addition, the intent definition module 210 establishes phrases and associates sets of phrases with each defined category. The phrases are text which, if found in input text, indicates that the input text expresses an intent with respect to a given category. A phrase may be represented as one or more n-grams, where an n-gram is a contiguous sequence of characters such as letters and/or words.

In one embodiment, the intent definition module 210 represents the set of phrases using a set of predicates that express generic intent (i.e., the intent is not limited to a specific category). For example, the predicates may include "I want to know," "I want to buy," and "I want to do." Here, "I want to know" indicates an intent to acquire information," "I want to buy" indicates an intent to purchase something, and "I want to do" indicates an intent to perform an action. There can be many such phrases for each intent. For example, the intent to purchase can also be expressed by the phrases "where to buy" and "best price for."

Each category, in turn, includes a set of phrases, called "subjects," that narrow a generic intent expression to the specific category. A subject, when appearing in an n-gram in proximity which a generic intent expression, indicates that the intent is expressed with respect to the category associated with the subject. The subjects can also be described as keywords that tie an expression of intent to particular categories. For example, the "vehicle" category can include the phrases "car," "truck," "ride," and "bike," as well as a list of popular makes and models of vehicles. When one of these subjects is combined with a predicate, the resulting combined phrase indicates an intent with respect to a particular category. Thus, the combined phrases "I want to buy a car" and "best price for [particular make and model of vehicle]" both indicate an intent to purchase a vehicle.

Alternatively, or in addition, the intent definition module 210 may include phrases that are unique to particular categories (i.e., are not formed by combining generic predicates with specific subjects). For example, the phrase "I'm hungry" may indicate an intent to purchase specific to the food category. Similarly, the phrase "flights to [location]" may indicate an intent to purchase with respect to the travel category.

In one embodiment, the intent definition module 210 provides a user interface with which an administrator associated with the messaging server 110 interacts to specify and/or select from among a list of categories. Likewise, the administrator can interact with the interface to specify and/or select the phrases, including predicates, subjects, combined phrases and/or unique phrases and associate the phrases with specific categories.

A stage definition module 212 associates the phrases described by the intent definition module 210 with particular stages of the individual categories (i.e., with particular intent groups). As mentioned earlier, a stage describes the strength of intent to perform a future action. In one example, the stages include awareness, interest, decision, and action. "Awareness" indicates awareness of the existence of a category. "Interest" indicates active expression of interest in the category. "Decision" indicates that a decision has been made with respect to the category. Finally, "action" indicates follow through on the decision (e.g., making a purchase). Different categories can have different types of stages as well as different numbers of stages.

In one embodiment, the stage definition module 212 provides a user interface with which the administrator interacts to define the stages for individual categories. For a given category, the administrator specifies and/or selects from among a list of stages for the category. The administrator may indicate that a category has a set of default stages, or define a set of custom stages for a category.

In addition, the stage definition module 212 associates the phrases for a category with particular stages of that category (i.e., with particular intent groups). For each category, the stage definition module 212 partitions the set of associated phrases by assigning each phrase in the set to one of the defined stages for the category (also referred to as a "category/stage pair"). The stage definition module 212 may associate the phrases with stages by providing a user interface with which the administrator can indicate to which stage a given phrase belongs.

For example, assume that the food category includes the categories "interest" and "decision." Also assume that the food category includes the phrases "I'm hungry" and "let's eat sushi." The administrator can interact with the stage definition module 212 using the UI to assign the phrase "I'm hungry" with the intent group food/interest and assign the phrase "let's eat sushi" with the intent group food/decision.

A stage vocabulary module 214 expands the vocabulary of phrases for intent groups. The stage vocabulary module 214 uses the set of phrases associated with a particular intent group as seed phrases. The stage vocabulary module 214 uses the seed phrases to identify other phrases that express the same intent and strength of intent as the seed phrases. The stage vocabulary module 214 associates these other phrases with the intent group, thereby forming an expanded vocabulary of phrases associated with the intent group.

In one embodiment, the stage vocabulary module 214 performs the vocabulary expansion by accessing a corpus of conversational text data. The corpus may be located within the stage vocabulary module 214 or accessible via the network 114. The corpus contains conversational text. The corpus may be formed of conversational text generated within a preceding time interval, such as the previous month or six months. The conversational text represents a conversation between two or more participants.

To expand a seed phrase associated with an intent group, the stage vocabulary module 214 applies the phrase to a corpus to identify other phrases that frequently appear in connection with the seed phrase. These other phrases may include phrases that are collocated (located together) with the seed phrase. For example, the other phrases may include words and/or n-grams that occur within m distance from the seed phrase, where m is an integer representing a number of characters or words. These other words form an expanded vocabulary based on and including the seed phrase. The stage vocabulary module 214 may filter the expanded vocabulary to remove noise words (also called "stop words") that are unlikely to have meaning with respect to the intent group. In one embodiment, the stage vocabulary module 214 performs TF-IDF (term frequency-inverse document frequency) on the expanded vocabulary to assign scores to each word in the expanded vocabulary. The stage vocabulary module 214 then removes words having scores below an expansion threshold from the expanded vocabulary. The stage vocabulary module 214 stores the expanded vocabulary (which includes the seed phrases) in association with the intent group of the seed phrases. The expanded vocabulary thus forms the set of phrases associated with the intent group.

Some embodiments of the stage vocabulary module 214 use additional and/or other techniques to expand the vocabulary of phrases for the intent groups. An embodiment of the stage vocabulary module 214 queries a lexical database to identify synonyms and/or other phrases that have the same meaning and/or commonly appear with the seed phrases. These identified phrases are combined with the seed phrases and other phrases in the expanded vocabularies.

A model generation module 216 builds one or more machine-learned intent models that indicate the intents expressed in input conversational text with respect to the defined intent groups. The intent model produced by the model generation module 216 indicates the expression of intent for a given intent group if the input conversational text indicates such an intent. Specifically, if the input conversational text uses phrases that are within the expanded vocabulary associated with a particular intent group, the intent model indicates that the input text expresses (or "has") the type of intent represented by that intent group. The input conversational text may express multiple types of intent, and the intent model may indicate expressions of intent for multiple intent groups simultaneously. Depending upon the embodiment, the model generation module 216 can build a combined intent model that detects expressions of intent multiple intent groups, can build separate models for each category and/or intent group, or can use a combined approach for different categories or intent groups.

The model generation module 216 applies machine learning techniques to generate an intent model. The intent model, when applied to input conversational text, outputs an indication of whether the input text expresses the type of intent represented by a particular intent group. As part of the generation of the intent model, the model generation module 216 forms a training set of input text by identifying a positive training set of conversational text that has the type of intent in question, and, in some embodiments, forms a negative training set of conversational text that lacks the type of intent in question. The training sets may be generated using automated techniques and/or generated using manual selection by an administrator associated with the messaging server 110.

For example, the positive training set may be formed of input conversational text that contains one or more of the phrases within the expanded vocabulary for the particular intent group. The input text in the positive training set may include just one side of a conversation in which at least one of the phrases was used, or the positive training set may include both sides of the conversation. The negative training set, in contrast, may include conversational text that lacks any phrases found within the expanded vocabulary for the particular intent group. Alternatively, the negative training set may include conversational text that contain one or more phrases found within the expanded vocabulary for the intent group yet do not indicate the associated intent.

The model generation module 216 extracts feature values from the input text in the training set, the features being variables deemed potentially relevant to whether the text indicates the associated types of intents. Specifically, the feature values extracted by the model generation module 216 may include content features describing the content of the text and general features describing non-content related features of the text. The content features may include, for example, the absence or presence of particular phrases within the text, the absence or presence of punctuation in the text, the position of individual phrases within the text, and the number of times phrases appears in the text. The general features may include, for example, demographic characteristics of a participant associated with the input conversational text and the day/date/time at which the conversation occurred. An ordered list of the features for the input text, or a subset of the input text, forms a feature vector for the text. One or more feature vectors for different associated with a participant, and/or a feature vector generated from multiple ones of that participant's text, forms a feature vector for that participant. In one embodiment, the model generation module 216 applies dimensionality reduction (e.g., via linear discriminant analysis (LDA), principle component analysis (PCA), or the like) to reduce the amount of data in the feature vectors to a smaller, more representative set of data.

The model generation module 216 uses supervised machine learning to train the intent model, with the feature vectors of the positive training set and the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The intent model, when applied to the feature vector extracted from one or more input texts, outputs an indication of whether the input texts indicate the type of intent represented by a particular intent group, such as a Boolean yes/no estimate, or a scalar value representing a probability. The intent model can thus be applied to a feature vector for a participant in order to assign the participant to one or more intent groups.

In some embodiments, a validation set is formed of additional input conversational text, other than those in the training sets, which have already been determined to have or to lack the types of intent in question. The model generation module 216 applies the trained intent model to the text in the validation set to quantify the accuracy of the intent model. Common metrics applied in accuracy measurement include: Precision=TP/(TP+FP) and Recall=TP/(TP+FN), where precision is how many the intents the model correctly predicted (TP or true positives) out of the total it predicted (TP+FP or false positives), and recall is how many the intent model correctly predicted (TP) out of the total number of input texts that did have the property in question (TP+FN or false negatives). The F score (F-score=2*PR/(P+R)) unifies precision and recall into a single measure. In one embodiment, the model generation module 216 iteratively re-trains the intent model until the occurrence of a stopping condition, such as the accuracy measurement indication that the model is sufficiently accurate, or a number of training rounds having taken place.

Figure 3:
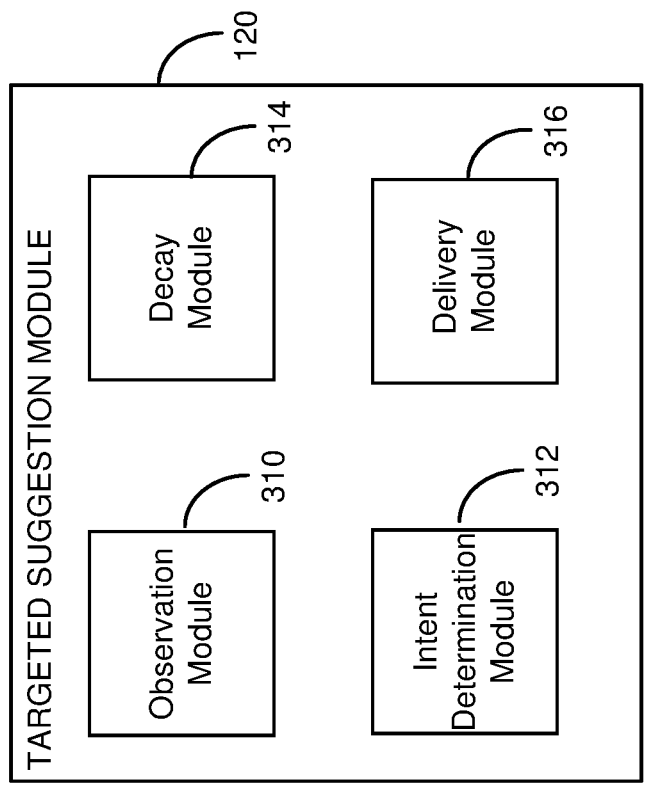
FIG. 3 is a block diagram illustrating a more detailed view of the targeted suggestion module according to one embodiment.

FIG. 3 is a block diagram illustrating a more detailed view of the targeted suggestion module 120 according to one embodiment. The targeted suggestion module 120 shown in FIG. 3 includes multiple modules within it. In some embodiments, the targeted suggestion module 120 may include additional, fewer, or different modules than those described herein. In addition, the operations attributed to specific modules herein may be performed by other modules in other embodiments.

An observation module 310 receives conversational text associated with users of the messaging server 110. The observation module 310 collects text features from subsets of the observed text. The text features may include the content features and the general features described earlier. The observation module 310 may represent the text features using one or feature vectors, including feature vectors for subsets of observed text and feature vectors for users associated with the subsets of observed text.

Depending upon the embodiment, the observation module 310 may collect text features describing individual text subsets. In this case, the observation module 310 collects text features from specific subsets of text associated with individual users. The feature vector generated for an individual text subset associated with a user reflects the features of that specific text subset and are independent of other text subsets associated with the user.

The observation module 310 may also collect text features describing aggregations text subsets. Here, the observation module 310 collects text features from multiple different text subsets associated with one or more users or multiple users. For example, the observation module 310 may collect text features for text subsets associated with a user over a specified time period (e.g., last 7 days). The observation module 310 may also collect text features for text subsets associated with particular sets of users. The observation module 310 may also collect text features using subsets of text selected using combinations of time and user-based criteria.

An intent determination module 312 assigns users to intent groups based on the conversational text observed by the observation module 310. In one embodiment, the intent determination module 312 applies the one or more intent models generated by the model generation module 216 to the text features collected by the observation module 310 and uses the output of the models to determine the intent expressed by the text features. The intent determination module 312 may also provide a feature vector for a user generated by the observation module 310 to the intent model. The intent model produces one or more outputs indicating whether the text subset associated with the text features and the user expresses particular intents.

The intent determination module 312 uses the intent model output to assign the user to the appropriate intent groups. Generally, the intent model produces an output indicating a probability that the input text expresses intent associated with a particular intent group. The intent determination module 312 applies a threshold to the output and assigns the associated user to the intent group if the probability exceeds the threshold value. For example, if the intent model produces a Boolean output, the intent determination module 312 assigns the user to the intent group if the Boolean output is true (e.g., 100% probability). If the intent model produces a scalar value between 0 and 1, the intent determination module 312 assigns the user to the intent group if the scalar value exceeds the threshold (e.g., 0.75).

A decay module 314 selectively removes users from intent groups based on recency. In one embodiment, the decay module 314 applies decay factors to intent groups. A decay factor removes users from an intent group (i.e. determines that the users no longer have the type of intent represented by the intent group) based on a decay rate. The decay factor accounts for the fact that intents fade over time, and different types of intents fade at different rates. In one embodiment, the decay module 314 maintains a decay rate for each intent group. The decay rate describes how long a user maintains the type of intent represented by the intent group. The decay rate may specify the length of the intent type based on time (e.g., five days) or using other techniques. The decay module 218 detects when a user is assigned a particular intent group, applies the decay rate to the user for the intent group, and unassigns (i.e., removes) the user from the intent group when the length of time that the user maintains the type of intent for the intent group is exceeded.

To understand decay rates, consider a user associated with the conversational text "I'm thinking about buying a new car." Assume this user is assigned to the vehicle/interest intent group. The decay rate for the vehicle/interest intent group is relatively slow because people tend to take a long time to make car purchases. Therefore, the decay module 314 leaves the user in this intent group for a relatively long time (e.g., a week or two). In contrast, consider a user associated with the conversational text "Let's get Chinese food for dinner tonight." This user may be assigned to the food/decision intent group. The decay rate for the food/decision intent group is relatively fast because people tend to purchase food soon after making a decision regarding what to eat. Therefore, the decay module 314 leaves the user in this intent group for a relatively short time (e.g., a few hours).

A delivery module 316 selects and provides content items such as targeted suggestions to users of the clients 112. The delivery module 316 supports the targeting of suggestions to users based on the intent groups to which the users are assigned. Thus, the delivery module 316 can deliver particular suggestions to users who have intents associated with particular categories and stages.

In one embodiment, the delivery module 316 stores or accesses a set of suggestions. Each suggestion has associated targeting criteria describing users to whom the suggestion should be delivered. The targeting criteria may identify one or more intent groups (e.g., "food/decision") to which the associated suggestion is targeted. The targeting criteria may indicate to provide the suggestion based on the presence of one criterion or a combination of criteria.

A suggestion identifies a plan of action for consideration by a user. For example, a suggestion may offer to make dinner reservation, show a list of movie start times, or provide a list of local auto dealerships. The suggestions may be tailored to the particular intent groups to which the suggestions are targeted. Thus, a suggestion targeted to the food/interest intent group might provide or offer to provide a list of top-rated local restaurants while a suggestion targeted to the food/decision intent group might offer to make reservations at a particular restaurant.

The delivery module 316 interacts with the observation module 310, intent determination module 312, and decay module 314 to determine whether the targeting criteria for the suggestions are satisfied. If the targeting criteria for a suggestion are satisfied with respect to a particular user, the delivery module 316 may provide the suggestion to the user as a targeted suggestion. If the targeting criteria for multiple suggestions are satisfied, the delivery module 316 selects a particular suggestion for delivery based on selection criteria.

Figure 4:
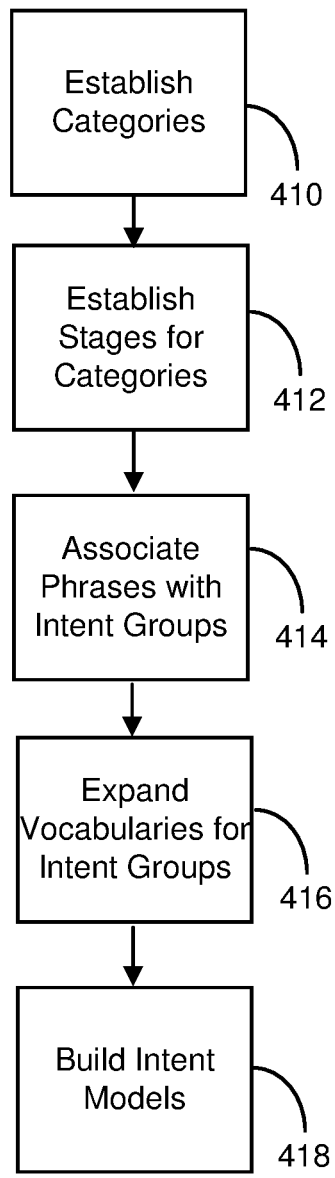
FIG. 4 is a flow chart illustrating operations of the intent module according to one embodiment.

FIG. 4 is a flow chart illustrating operations of the intent module 118 according to one embodiment. Other embodiments of the intent module 118 can perform different operations and the operations may occur in different orders. Additionally, in other embodiments, some operations may be performed by different entities.

The flow chart of FIG. 4 begins with the intent module 118 establishing 410 a set of categories for which intents are to be captured. The categories represent different subject areas in which intents may be expressed, such as vehicles, travel, and food. The intent module 118 also establishes 412 a set of stages for each category. A stage describe the strength of an intent. In addition, the intent module 118 associates 414 sets of phrases with particular categories and stages of those categories. In other words, the intent module 118 associates the phrases with particular intent groups.

The intent module 118 expands 416 the vocabularies of phrases for the intent groups. This expansion is performed by using the phrases associated with the intent groups as seed phrases to identify other phrases that express the same intent and strength of intent as the seed phrases, such as phrases in a corpus of conversational text data that frequently appear in connection with a seed phrase. The intent module 118 uses the expanded vocabularies to build 418 machine-learned intent models. An intent model indicates the expression of intent for a given intent group if the input conversational text indicates such an intent.

Figure 5:
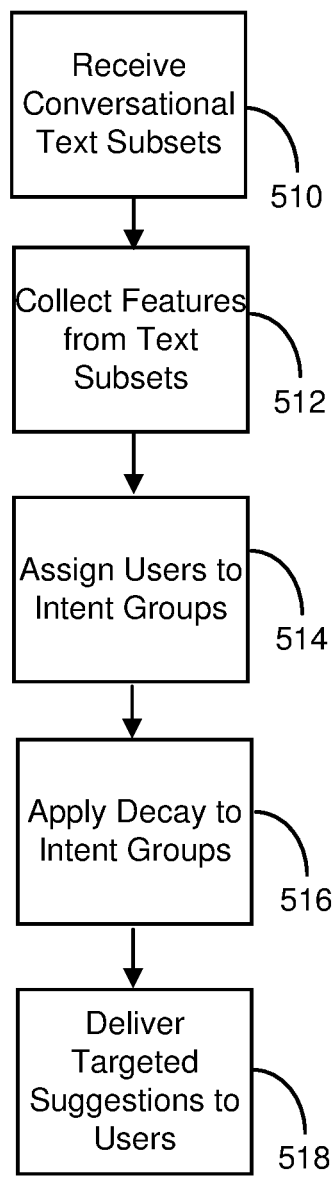
FIG. 5 is a flow chart illustrating operations of the targeted suggestion module according to one embodiment.

FIG. 5 is a flow chart illustrating operations of the targeted suggestion module 120 according to one embodiment. Other embodiments of the targeted suggestion module 120 can perform different operations and the operations may occur in different orders. Additionally, in other embodiments, some operations may be performed by different entities.

The targeted suggestion module 120 receives 510 conversational text associated with users of the messaging server 110. The targeted suggestion module 120 collects 512 text features from subsets of the text, such as from messages exchanged by a particular user within a particular timeframe. In addition, the targeted suggestion module 120 assigns users to intent groups based on the text features. These assignments are performed using the intent models built by the intent module 118 to determine intents expressed by the text subsets. The targeted suggestion module 120 also applies 516 decay to the intent group assignments. The decay selectively removes users from the intent groups based on decay factors which account for intents that fade over time. The targeted suggestion module 120 delivers 518 targeted suggestions to clients of users. The suggestions are selectively delivered based at least in part on targeting criteria associated with the suggestions. The targeting criteria may include one or more intent groups. The clients 112 present the targeted suggestion to the users.

Figure 6:
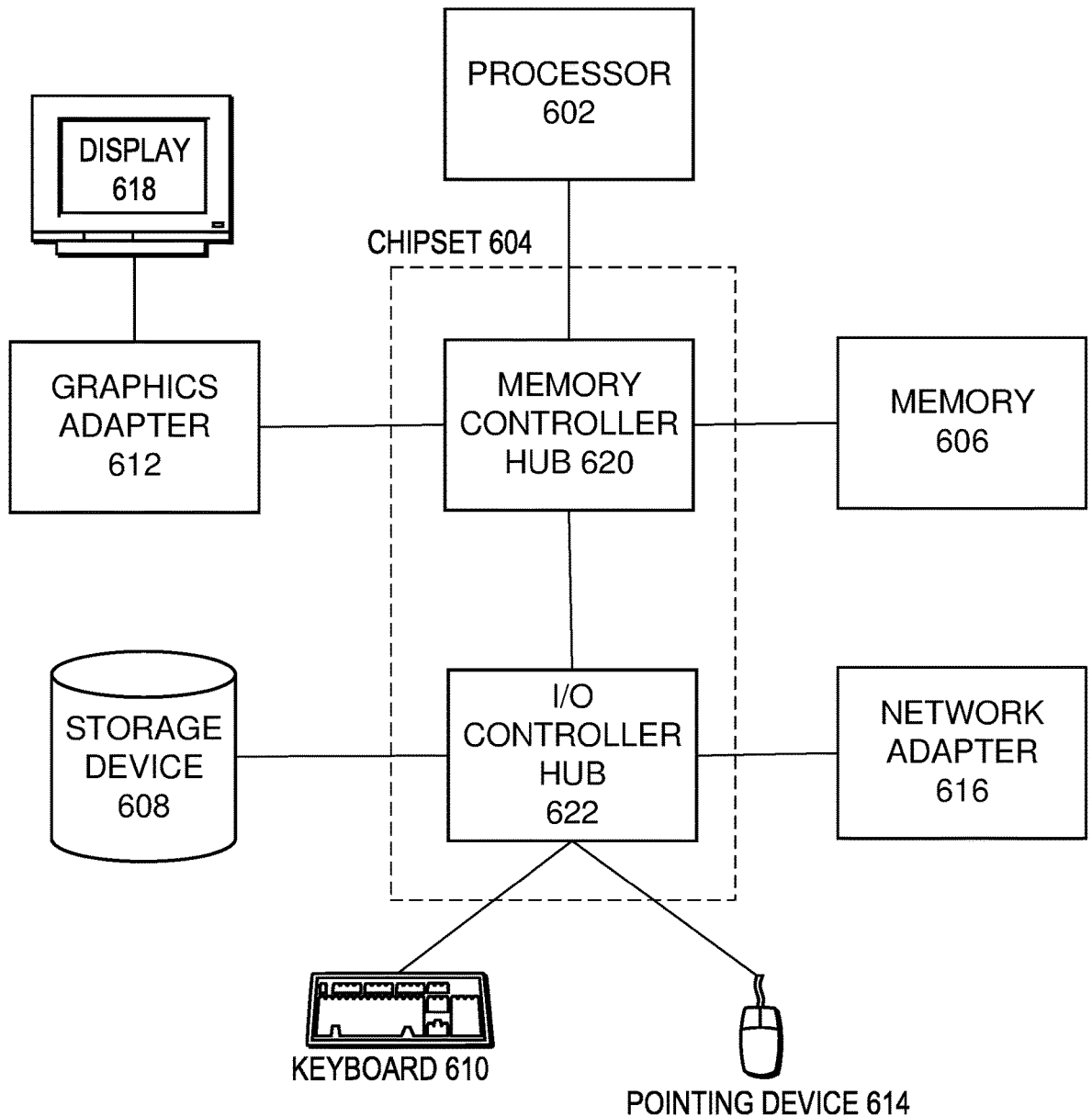
FIG. 6 is a high-level block diagram illustrating physical components of a computer used as part or all of one or more of the entities described herein in one embodiment.

FIG. 6 is a high-level block diagram illustrating physical components of a computer 600 used as part or all of one or more of the entities described herein in one embodiment. For example, instances of the illustrated computer 600 may be used as a the messaging server 110. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600. The graphics adapter 612 displays images and other information on the display 618. The network adapter 616 couples the computer system 600 to a local or wide area network.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving a conversational text subset;
   providing the conversational text subset to a machine-learned intent model executing on a computer system, the intent model analyzing the conversational text subset to identify intents expressed within the conversational text subset;
   determining an intent group for a category associated with conversational text subset based on the intents expressed within the conversational text subset, the intent group describing a combination of the category representing a subject area in which the conversational text subset expressed an intent and a stage representing a strength of the expressed intent;
   associating a set of phrases with the intent group;
   expanding the set of phrases associated with the intent group for the category by using the set of phrases as seed phrases to identify other phrases in a corpus that express a same intent in the category and a same strength of the expressed intent as the seed phrases to produce an expanded vocabulary for the intent group including the phrases and the identified other phrases associated with the pair of the category and the stage representing the strength of the expressed intent, the corpus comprising conversational text representing a conversation between two or more participants generated within a preceding time interval; and
   building the machine-learned intent model using the expanded vocabulary for the intent group.

2. The method of claim 1, further comprising:
   assigning a user of a messaging server associated with the conversational text subset to the intent group;
   identifying a length of time for which the user has been assigned to the intent group;
   applying a decay factor to the intent group, the decay factor including a decay rate that describes how long the user maintains a type of intent represented by the intent group; and
   selectively unassigning the user from the intent group responsive to the length of time for which the user has been assigned to the intent group and the decay factor applied to the intent group.

3. The method of claim 2, wherein there are a plurality of intent groups and different intent groups of the plurality have different associated decay factors with different decay rates, and wherein applying the decay factor to the intent group comprises apply a decay factor associated with the intent group to the intent group.

4. The method of claim 1, further comprising:
   selecting a suggestion for delivery to a user of a messaging server associated with the conversational text subset, the suggestion selected responsive at least in part to the intent group associated with the conversational text subset; and
   delivering the selected suggestion to the user via the messaging server.

5. The method of claim 4, wherein selecting the suggestion for delivery to the user comprises:
   determining targeting criteria associated with the suggestion, the targeting criteria comprising an intent group to which the suggestion is targeted;
   determining that the user is associated with the conversational text subset associated with the intent group to which the suggestion is targeted; and
   selecting the suggestion for delivery to the user responsive to determining that the user is associated with the conversational text subset associated with the intent group to which the suggestion is targeted.

6. The method of claim 1, wherein determining the intent group comprises:
   determining that the conversational text subset is associated with a plurality of different intent groups based on the intents expressed within the conversational text subset.

7. A non-transitory computer-readable medium storing computer program instructions executable by a processor to perform operations comprising:
   receiving a conversational text subset;
   providing the conversational text subset to a machine-learned intent model executing on a computer system, the intent model analyzing the conversational text subset to identify intents expressed within the conversational text subset;
   determining an intent group for a category associated with conversational text subset based on the intents expressed within the conversational text subset, the intent group describing a combination of the category representing a subject area in which the conversational text subset expressed an intent and a stage representing a strength of the expressed intent;
   associating a set of phrases with the intent group;
   expanding the set of phrases associated with the intent group for the category by using the set of phrases as seed phrases to identify other phrases in a corpus that express a same intent in the category and a same strength of the expressed intent as the seed phrases to produce an expanded vocabulary for the intent group including the phrases and the identified other phrases associated with the pair of the category and the stage representing the strength of the expressed intent, the corpus comprising conversational text representing a conversation between two or more participants generated within a preceding time interval; and
   building the machine-learned intent model using the expanded vocabulary for the intent group.

8. The computer-readable medium of claim 7, the operations further comprising:
   assigning a user of a messaging server associated with the conversational text subset to the intent group;
   identifying a length of time for which the user has been assigned to the intent group;
   applying a decay factor to the intent group, the decay factor including a decay rate that describes how long the user maintains a type of intent represented by the intent group; and
   selectively unassigning the user from the intent group responsive to the length of time for which the user has been assigned to the intent group and the decay factor applied to the intent group.

9. The computer-readable medium of claim 8, wherein there are a plurality of intent groups and different intent groups of the plurality have different associated decay factors with different decay rates, and wherein applying the decay factor to the intent group comprises apply a decay factor associated with the intent group to the intent group.

10. The computer-readable medium of claim 7, further comprising:
    selecting a suggestion for delivery to a user of a messaging server associated with the conversational text subset, the suggestion selected responsive at least in part to the intent group associated with the conversational text subset; and
    delivering the selected suggestion to the user via the messaging server.

11. The computer-readable medium of claim 10, wherein selecting the suggestion for delivery to the user comprises:
    determining targeting criteria associated with the suggestion, the targeting criteria comprising an intent group to which the suggestion is targeted;
    determining that the user is associated with the conversational text subset associated with the intent group to which the suggestion is targeted; and
    selecting the suggestion for delivery to the user responsive to determining that the user is associated with the conversational text subset associated with the intent group to which the suggestion is targeted.

12. The computer-readable medium of claim 7, wherein determining the intent group comprises:
    determining that the conversational text subset is associated with a plurality of different intent groups based on the intents expressed within the conversational text subset.

13. A computer system comprising:
    a computer processor adapted to execute computer program instructions; and
    a non-transitory computer-readable storage medium storing computer program instructions executable by the processor to perform operations comprising:
    receiving a conversational text subset;
    providing the conversational text subset to a machine-learned intent model executing on a computer system, the intent model analyzing the conversational text subset to identify intents expressed within the conversational text subset;
    determining an intent group for a category associated with conversational text subset based on the intents expressed within the conversational text subset, the intent group describing a combination of the category representing a subject area in which the conversational text subset expressed an intent and a stage representing a strength of the expressed intent;
    associating a set of phrases with the intent group;
    expanding the set of phrases associated with the intent group for the category by using the set of phrases as seed phrases to identify other phrases in a corpus that express a same intent in the category and a same strength of the expressed intent as the seed phrases to produce an expanded vocabulary for the intent group including the phrases and the identified other phrases associated with the pair of the category and the stage representing the strength of the expressed intent, the corpus comprising conversational text representing a conversation between two or more participants generated within a preceding time interval; and building the machine-learned intent model using the expanded vocabulary for the intent group.

14. The computer system of claim 13, the operations further comprising:

assigning a user of a messaging server associated with the conversational text subset to the intent group;

identifying a length of time for which the user has been assigned to the intent group;

applying a decay factor to the intent group, the decay factor including a decay rate that describes how long the user maintains a type of intent represented by the intent group; and selectively unassigning the user from the intent group responsive to the length of time for which the user has been assigned to the intent group and the decay factor applied to the intent group.

15. The computer system of claim 13, the operations further comprising:

selecting a suggestion for delivery to a user of a messaging server associated with the conversational text subset, the suggestion selected responsive at least in part to the intent group associated with the conversational text subset; and delivering the selected suggestion to the user via the messaging server.

16. The computer system of claim 15, wherein selecting the suggestion for delivery to the user comprises:

determining targeting criteria associated with the suggestion, the targeting criteria comprising an intent group to which the suggestion is targeted;

determining that the user is associated with the conversational text subset associated with the intent group to which the suggestion is targeted; and selecting the suggestion for delivery to the user responsive to determining that the user is associated with the conversational text subset associated with the intent group to which the suggestion is targeted.

17. The computer system of claim 13, wherein determining the intent group comprises:

determining that the conversational text subset is associated with a plurality of different intent groups based on the intents expressed within the conversational text subset.

* * * * *